United States Patent
Deng et al.

(10) Patent No.: US 10,948,655 B2
(45) Date of Patent: Mar. 16, 2021

(54) OPTICAL COUPLING APPARATUS AND CONTROL METHOD THEREOF

(71) Applicant: HUAWEI TECHNOLOGIES CO., LTD., Guangdong (CN)

(72) Inventors: Shupeng Deng, Shenzhen (CN); Lei Liu, Chengdu (CN); Chi Yan Wong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/384,583

(22) Filed: Apr. 15, 2019

(65) Prior Publication Data

US 2019/0243068 A1 Aug. 8, 2019

Related U.S. Application Data

(63) Continuation of application No. PCT/CN2016/102314, filed on Oct. 18, 2016.

(51) Int. Cl.
*G02B 6/27* (2006.01)
*G02B 6/26* (2006.01)
(Continued)

(52) U.S. Cl.
CPC ......... *G02B 6/272* (2013.01); *G02B 6/12004* (2013.01); *G02B 6/126* (2013.01);
(Continued)

(58) Field of Classification Search
CPC .. G02B 6/12004; G02B 6/122; G02B 6/1228; G02B 6/27; G02B 6/272; G02B 6/262;
(Continued)

(56) References Cited

U.S. PATENT DOCUMENTS 6,470,119 B1 10/2002 Albrecht et al.
9,256,084 B2 2/2016 Kato et al.
(Continued)

FOREIGN PATENT DOCUMENTS

CN 1238841 A 12/1999
CN 1580840 A 2/2005
(Continued)

OTHER PUBLICATIONS

J. Niklas Caspers et al, Active polarization independent coupling to silicon photonics circuit. Proc. SPIE 9133, Silicon Photonics and Photonic Integrated Circuits IV, 91330G (May 1, 2014), 12 pages.
(Continued)

*Primary Examiner* — Michael P Mooney
(74) *Attorney, Agent, or Firm* — Womble Bond Dickinson (US) LLP

(57) ABSTRACT

An optical coupling apparatus includes: a coupling and polarization beamsplitter, a phase shifter, a 2×2 adjustable beamsplitter, a photoelectric detector, and a microprocessor. Light in any polarization direction can be coupled from an optical fiber into a waveguide, an extra insertion loss is small, intrinsic insertion losses for light in different polarization directions are the same, a structure is simple, and miniaturization is easy to be implemented.

13 Claims, 1 Drawing Sheet

(51) Int. Cl.
*G02B 26/02* (2006.01)
*G02B 6/126* (2006.01)
*G02B 6/12* (2006.01)
*G02B 27/28* (2006.01)

(52) U.S. Cl.
CPC .............. *G02B 6/262* (2013.01); *G02B 6/268* (2013.01); *G02B 26/02* (2013.01); *G02B 27/28* (2013.01)

(58) Field of Classification Search
CPC ...... G02B 6/268; G02B 6/126; G02B 6/2726; G02B 6/34; G02B 6/2773; G02B 6/278; G02B 6/2766; G02B 6/29344; G02B 6/4214; G02B 6/43; G02B 26/02; G02B 27/28; G02F 1/025; G02F 1/0121; G02F 1/011
USPC .............. 385/1–8, 11, 14, 27–28, 37, 39, 43
See application file for complete search history.

(56) References Cited

U.S. PATENT DOCUMENTS

| | | | |
|---|---|---|---|
| 2009/0245794 | A1 | 10/2009 | Sakharov |
| 2010/0265504 | A1 | 10/2010 | Kopp et al. |
| 2012/0207428 | A1 | 8/2012 | Roelkens et al. |
| 2014/0002907 | A1 | 1/2014 | Liu |
| 2014/0133793 | A1 | 5/2014 | Masaki et al. |
| 2016/0088613 | A1 | 3/2016 | Li et al. |
| 2016/0313505 | A1* | 10/2016 | Ma .......................... G02F 1/025 |

FOREIGN PATENT DOCUMENTS

| | | |
|---|---|---|
| CN | 101405974 A | 4/2009 |
| CN | 101852968 A | 10/2010 |
| CN | 102436038 A | 5/2012 |
| CN | 102944916 A | 2/2013 |
| CN | 103197431 A | 7/2013 |
| CN | 203217188 U | 9/2013 |
| CN | 104396296 A | 3/2015 |
| CN | 105141258 A | 12/2015 |
| EP | 3035113 A1 | 6/2016 |
| WO | 2011051358 A1 | 5/2011 |
| WO | 2015176311 A1 | 11/2015 |

OTHER PUBLICATIONS

Wen Zhen-li et al, The Influence of 5-Dimension Butting Error in Optic Fiber-Waveguide-Fiber on Coupling Loss. Opto-Electronic Engineering, vol. 27, No. 5, Oct. 2000, 4 pages.

* cited by examiner

OPTICAL COUPLING APPARATUS AND CONTROL METHOD THEREOF

CROSS-REFERENCE TO RELATED APPLICATIONS

This application is a continuation of International Application No. PCT/CN2016/102314, filed on Oct. 18, 2016, the disclosure of which is hereby incorporated by reference in its entirety.

TECHNICAL FIELD

The present application relates to the field of optical communications technologies, and in particular, to an optical coupling apparatus and a control method thereof.

BACKGROUND

Currently, silicon photonics application is developing towards directions such as high density and wavelength division. All key devices, for example, refractive index sensitive devices such as an arrayed waveguide grating (AWG) and a microloop, have strong polarization dependency, and therefore polarization independent coupling is of utmost importance.

An existing method for polarization independent coupling is: light in an optical fiber is coupled into a waveguide by using a two-dimensional grating coupler (2DGC), to obtain two transverse electric (TE) polarized beams. Phase control is performed on the two TE polarized beams by using a phase shifter, to enable a phase difference between the two TE polarized beams to be 0. Beam combination is performed on the two TE polarized beams whose phase difference is 0 by using a 1×2 beam combiner, to obtain one TE polarized beam.

In the foregoing method, the light existing in the optical fiber is in any polarization direction. For a TE/transverse magnetic (TM) evenly mixed polarized beam, an intrinsic insertion loss is 0. For a pure TE or TM polarized beam, an intrinsic insertion loss is 3 dB. Therefore, for light in different polarization directions, intrinsic insertion losses are different, and an extra insertion loss is relatively large.

SUMMARY

Embodiments of the present application provide an optical coupling apparatus and a control method thereof. Light in any polarization direction may be coupled from an optical fiber into a waveguide, and an extra insertion loss is small.

According to a first aspect, an embodiment of the present application provides an optical coupling apparatus, including:

a coupling and polarization beamsplitter, a phase shifter, a 2×2 adjustable beamsplitter, a photoelectric detector, and a microprocessor, where the coupling and polarization beamsplitter is configured to: couple light from an optical fiber into a waveguide, and perform polarization beam splitting and rotation, to obtain a first TE polarized beam and a second TE polarized beam, the first TE polarized beam and the second TE polarized beam having a phase difference, wherein a ratio of intensity of the first TE polarized beam to intensity of the second TE polarized beam is $a_1:a_2$; the phase shifter is configured to adjust the phase difference between the first TE polarized beam and the second TE polarized beam based on a working voltage; the 2×2 adjustable beamsplitter is configured to: adjust a split ratio based on a working voltage, and perform beam combination processing on the first TE polarized beam and the second TE polarized beam based on the split ratio, to obtain a first output and a second output; the photoelectric detector is configured to: detect a working current of the first output, and send the working current to the microprocessor; and the microprocessor is configured to adjust the working voltage of the phase shifter and the working voltage of the 2×2 adjustable beamsplitter based on the received working current.

In the optical coupling apparatus provided in this embodiment of the present application, the coupling and polarization beamsplitter, the phase shifter, the 2×2 adjustable beamsplitter, the photoelectric detector, and the microprocessor are disposed. The coupling and polarization beamsplitter couples the light from the optical fiber into the waveguide, and performs polarization beam splitting, to obtain the first TE polarized beam and the second TE polarized beam, the first TE polarized beam and the second TE polarized beam having the phase difference; next, the phase shifter adjusts the phase difference between the two polarized beams; then the 2×2 adjustable beamsplitter performs beam combination processing, to obtain the two outputs; the photoelectric detector detects the working current of the first output thereof, and feeds back the detected working current to the microprocessor; Based on the received working current, the microprocessor controls the voltage of the phase shifter and adjusts the working voltage of the 2×2 adjustable beamsplitter, to enable the working current of the first output to be close to a theoretical value of 0. In this way, light in any polarization direction can be coupled from an optical fiber into a waveguide, an extra insertion loss is small, a structure is simple, and miniaturization is easily implemented.

In one embodiment, the coupling and polarization beamsplitter comprises a spotsize converter and a polarization beamsplitter-rotator; the spotsize converter is configured to couple the light from the optical fiber into the waveguide; and the polarization beamsplitter-rotator is configured to perform polarization beam splitting and rotation, to obtain the first TE polarized beam and the second TE polarized beam, the first TE polarized beam and the second TE polarized beam having the phase difference.

In this embodiment, compared with a two-dimensional grating coupler, when the spotsize converter and the polarization beamsplitter-rotator are used, a very wide band can be covered, and optical bandwidth is relatively wide.

In one embodiment, the coupling and polarization beamsplitter is a two-dimensional grating coupler.

In one embodiment, the microprocessor is configured to adjust the working voltage of the phase shifter and the working voltage of the 2×2 adjustable beamsplitter, until the working current is less than or equal to a preset threshold.

In one embodiment, based on a target working voltage of the phase shifter and a target working voltage of the 2×2 adjustable beamsplitter, the microprocessor is configured to adjust the working voltage of the phase shifter and the working voltage of the 2×2 adjustable beamsplitter. The target working voltage of the phase shifter and the target working voltage of the 2×2 adjustable beamsplitter are a corresponding working voltage of the phase shifter and a corresponding working voltage of the 2×2 adjustable beamsplitter when the working current is the minimum.

According to a second aspect, an embodiment of the present application provides a control method for an optical coupling apparatus. The optical coupling apparatus includes a coupling and polarization beamsplitter, a phase shifter, a 2×2 adjustable beamsplitter, and a photoelectric detector, and the method includes: receiving a working current of a first output detected by the photoelectric detector, where the first output is one of two outputs obtained when the phase shifter performs phase difference adjustment and the 2×2 adjustable beamsplitter performs beam combination processing on a first TE polarized beam and a second TE polarized beam, wherein the first TE polarized beam and the second TE polarized beam, having a phase difference, are obtained after the coupling and polarization beamsplitter couples light from an optical fiber into a waveguide and performs polarization beam splitting and rotation, and a ratio of intensity of the first TE polarized beam to intensity of the second TE polarized beam is a1:a2; and adjusting a working voltage of the phase shifter and a working voltage of the 2×2 adjustable beamsplitter based on the working current.

According to the control method for the optical coupling apparatus provided in this embodiment of the present application, based on the received working current, the microprocessor controls the voltage of the phase shifter and adjusts the working voltage of the 2×2 adjustable beamsplitter, to enable optical power of the first output to be close to a theoretical value of 0. In this way, light in any polarization direction can be coupled from an optical fiber into a waveguide, and an extra insertion loss is small.

In one embodiment, the coupling and polarization beamsplitter comprises a spotsize converter and a polarization beamsplitter-rotator; the spotsize converter is configured to couple the light from the optical fiber into the waveguide; and the polarization beamsplitter-rotator is configured to perform polarization beam splitting and rotation, to obtain the first TE polarized beam and the second TE polarized beam, the first TE polarized beam and the second TE polarized beam having the phase difference.

In this embodiment, compared with a two-dimensional grating coupler, when the spotsize converter and the polarization beamsplitter-rotator are used, a very wide band can be covered, and optical bandwidth is relatively wide.

In one embodiment, the coupling and polarization beamsplitter is a two-dimensional grating coupler.

In one embodiment, adjusting the working voltage of the phase shifter and the working voltage of the 2×2 adjustable beamsplitter based on the received working current includes: adjusting the working voltage of the phase shifter and the working voltage of the 2×2 adjustable beamsplitter, until the working current is less than or equal to a preset threshold.

In one embodiment, adjusting a working voltage of the phase shifter and a working voltage of the 2×2 adjustable beamsplitter based on the working current includes: adjusting the working voltage of the phase shifter and the working voltage of the 2×2 adjustable beamsplitter based on a target working voltage of the phase shifter and a target working voltage of the 2×2 adjustable beamsplitter. The target working voltage of the phase shifter and the target working voltage of the 2×2 adjustable beamsplitter are a corresponding working voltage of the phase shifter and a corresponding working voltage of the 2×2 adjustable beamsplitter when the working current is the minimum.

According to a third aspect, an embodiment of the present application provides a control method for an optical coupling apparatus. The optical coupling apparatus includes a coupling and polarization beamsplitter, a phase shifter, a 2×2 adjustable beamsplitter, and a photoelectric detector, and the method includes:

coupling, by the coupling and polarization beamsplitter, light from an optical fiber into a waveguide, and performing polarization beam splitting and rotation, to obtain a first TE polarized beam and a second TE polarized beam, the first TE polarized beam and the second TE polarized beam having a phase difference, and a ratio of intensity of the first TE polarized beam to intensity of the second TE polarized beam is $a_1:a_2$; next, adjusting, by the phase shifter, the phase difference between the first TE polarized beam and the second TE polarized beam based on a working voltage; next, adjusting, by the 2×2 adjustable beamsplitter, a split ratio based on a working voltage, and performing beam combination processing on the first TE polarized beam and the second TE polarized beam based on the split ratio, to obtain a first output and a second output; next, detecting, by the photoelectric detector, a working current of the first output, and sending the working current to the microprocessor; and finally, adjusting, by the microprocessor, the working voltage of the phase shifter and the working voltage of the 2×2 adjustable beamsplitter based on the received working current.

According to the control method for the optical coupling apparatus provided in this embodiment of the present application, the coupling and polarization beamsplitter couples the light from the optical fiber into the waveguide, and performs polarization beam splitting, to obtain the first TE polarized beam and the second TE polarized beam, The first TE polarized beam and the second TE polarized beam having the phase difference; next, the phase shifter adjusts the phase difference between the two polarized beams; then the 2×2 adjustable beamsplitter performs beam combination processing, to obtain the two outputs; the photoelectric detector detects the working current of the first output thereof, and feeds back the detected working current to the microprocessor; and based on the received working current, the microprocessor controls the voltage of the phase shifter and adjusts the working voltage of the 2×2 adjustable beamsplitter, to enable the working current of the first output to be close to a theoretical value 0. In this way, light in any polarization direction can be coupled from an optical fiber into a waveguide, an extra insertion loss is small, a structure is simple, and miniaturization is easy to be implemented.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show some embodiments of the present application, and a person of ordinary skill in the art may derive other drawings from these accompanying drawings without creative efforts.

DESCRIPTION OF EMBODIMENTS

To make the objectives, technical solutions, and advantages of the embodiments of the present application clearer, the following clearly and describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

An optical coupling apparatus and a control method thereof that are provided in the embodiments of the present application are used for silicon photonic chip polarization independent coupling, to couple light (such as a linearly polarized beam or a circularly/elliptically polarized beam) in any polarization direction from an optical fiber into a waveguide. An extra insertion loss is small, and the optical coupling apparatus provided in the embodiments of the present application has a simple structure, and is easy to be miniaturized. The following describes technical solutions provided in the embodiments of the present application, in detail and with reference to the accompanying drawings.

Figure 1:
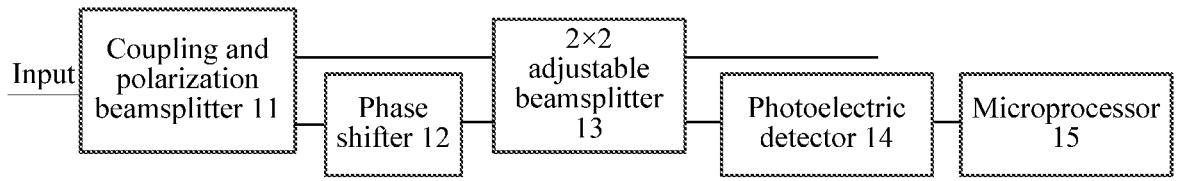
FIG. 1 is a schematic structural diagram of an optical coupling apparatus according to an embodiment of the present application.

FIG. 1 is a schematic structural diagram of an optical coupling apparatus according to an embodiment of the present application. As shown in FIG. 1, the optical coupling apparatus includes: a coupling and polarization beamsplitter 11, a phase shifter 12, a 2×2 adjustable beamsplitter 13, a photoelectric detector 14, and a microprocessor 15. The coupling and polarization beamsplitter 11 is configured to: couple light from an optical fiber into a waveguide, and perform polarization beam splitting and polarization rotation to obtain a first TE polarized beam and a second TE polarized beam, the first TE polarized beam and the second TE polarized beam having a phase difference, wherein a ratio of intensity of the first TE polarized beam to intensity of the second TE polarized beam is a1:a2. The phase shifter 12 is configured to adjust the phase difference between the first TE polarized beam and the second TE polarized beam based on a working voltage. The 2×2 adjustable beamsplitter 13 is configured to: adjust a split ratio based on a working voltage, and perform beam combination processing on the first TE polarized beam and the second TE polarized beam based on the split ratio, to obtain a first output and a second output. The photoelectric detector 14 is configured to: detect a working current of the first output, and send the working current to the microprocessor. The microprocessor 15 is configured to adjust the working voltage of the phase shifter and the working voltage of the 2×2 adjustable beamsplitter based on the received working current.

In one embodiment, the coupling and polarization beamsplitter 11 may be a two-dimensional grating coupler. The two-dimensional grating coupler may couple light from an optical fiber into a waveguide, and performs polarization beam splitting to obtain a first TE polarized beam and a second TE polarized beam, the first TE polarized beam and the second TE polarized beam having a phase difference. However, when grating coupling is used, optical bandwidth is reduced. Therefore, in this embodiment of the present application, the coupling and polarization beamsplitter 11 may comprise a spotsize converter and a polarization beamsplitter-rotator.

Figure 2:
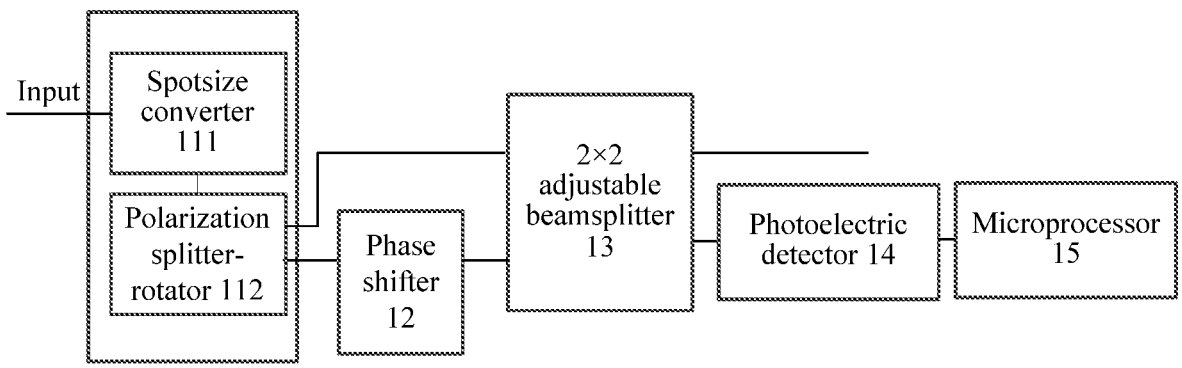
FIG. 2 is a schematic structural diagram of an optical coupling apparatus according to an embodiment of the present application.

FIG. 2 is a schematic structural diagram of an optical coupling apparatus according to an embodiment of the present application. As shown in FIG. 2, based on the optical coupling apparatus shown in FIG. 1, the coupling and polarization beamsplitter in FIG. 2 in this embodiment comprises a spotsize converter 111 and a polarization beamsplitter-rotator 112. The spotsize converter 111 is configured to couple the light from the optical fiber into the waveguide. The polarization beamsplitter-rotator 112 is configured to perform polarization beam splitting and rotation to obtain the first TE polarized beam and the second TE polarized beam, the first TE polarized beam and the second TE polarized beam having the phase difference. Compared with the two-dimensional grating coupler, when the spotsize converter and the polarization beamsplitter-rotator may cover a very wide band, and optical bandwidth is relatively wide.

In the foregoing embodiment, in an optional implementation, the microprocessor 15 is configured to adjust the working voltage of the phase shifter 12 and the working voltage of the 2×2 adjustable beamsplitter 13, until the working current is less than or equal to a preset threshold. For example, after the working current of the first output is received, the microprocessor 15 determines whether the working current is less than or equal to the preset threshold, and if the working current is less than or equal to the preset threshold, a current working voltage of the phase shifter 12 and a current working voltage of the 2×2 adjustable beamsplitter 13 are respectively used as target working voltages of the phase shifter 12 and the 2×2 adjustable beamsplitter 13; or if not, the microprocessor 15 continues to adjust the working voltage of the phase shifter 12 and the working voltage of the 2×2 adjustable beamsplitter 13. The preset threshold is experimental data, and a theoretical value is 0.

In another embodiment, the microprocessor 15 is configured to:

adjust the working voltage of the phase shifter 12 and the working voltage of the 2×2 adjustable beamsplitter 13 based on a target working voltage of the phase shifter 12 and a target working voltage of the 2×2 adjustable beamsplitter 13. The target working voltage of the phase shifter 12 and the target working voltage of the 2×2 adjustable beamsplitter 13 are a corresponding working voltage of the phase shifter 12 and a corresponding working voltage of the 2×2 adjustable beamsplitter 13 when the working current is the minimum. For example, the working current, which is the minimum, is determined as follows: determining a corresponding minimum value of the working current of the first output when the phase shifter 12 is working at N different working voltages in a first preset range and the 2×2 adjustable beamsplitter 13 is working at N different working voltages in a second preset range. A working voltage of the phase shifter 12 corresponding to the minimum value of the working current of the first output is used as the target working voltage of the phase shifter 12, and a working voltage of the 2×2 adjustable beamsplitter 13 corresponding to the minimum value of the working current of the first output is used as the target working voltage of the 2×2 adjustable beamsplitter 13. The first preset range and the second preset range may be close to a theoretical value 0, which is the working current of the first output.

Using an example, the coupling and polarization beamsplitter 11 comprises the spotsize converter and the polarization beamsplitter-rotator, the following describes in detail a technical principle for adjusting the working voltage of the phase shifter 12 and the working voltage of the 2×2 adjustable beamsplitter 13 to enable optical power of the first output to be 0.

Light in any polarization direction in an optical fiber may be represented, by using a Jones matrix, as:

$$J_{in} = \begin{pmatrix} a_1 \\ a_2 e^{j\varphi_0} \end{pmatrix},$$

where $a_1$ and $a_2$ are respectively light intensity components of a TE mode and a TM mode.

After a spotsize converter (SSC) couples light from an optical fiber into a waveguide, and the light in the waveguide passes through a polarization beamsplitter-rotator (PSR), a first TE polarized beam and a second TE polarized beam are obtained, the first TE polarized beam and the second TE polarized beam having a phase difference, wherein a ratio of intensity of the first TE polarized beam to intensity of the second TE polarized beam is a1:a2. The first TE polarized beam and the second TE polarized beam pass through the phase shifter 12, and the microprocessor 15 controls a voltage of the phase shifter 12 to enable the first TE polarized beam to have a phase $\varphi_1 = \varphi_0 + \theta_1 - \pi/2$, in other words, the phase difference between the two polarized beams is $\pi/2$. Electric vectors of the first TE polarized beam and the second TE polarized beam are:

$$\begin{pmatrix} E_{11} \\ E_{12} \end{pmatrix} = \begin{pmatrix} a_1 e^{j\varphi_1} \\ a_2 e^{j(\varphi_0 + \theta_1)} \end{pmatrix} = e^{j\varphi_1} \begin{pmatrix} a_1 \\ ja_2 \end{pmatrix}.$$

The first TE polarized beam and the second TE polarized beam pass through the 2×2 adjustable beamsplitter 13 (where a split ratio is 1:X), and the following may be obtained:

$$\begin{pmatrix} E_{21} \\ E_{22} \end{pmatrix} = \begin{pmatrix} \frac{1}{\sqrt{1+x^2}} & j\frac{x}{\sqrt{1+x^2}} \\ j\frac{x}{\sqrt{1+x^2}} & \frac{1}{\sqrt{1+x^2}} \end{pmatrix} \begin{pmatrix} E_{11} \\ E_{12} \end{pmatrix} = \frac{e^{j\varphi_1}}{\sqrt{1+x^2}} \begin{pmatrix} a_1 - xa_2 \\ j(xa_1 + a_2) \end{pmatrix}.$$

A working voltage of a 2×2 adjustable beamsplitter 13 is adjusted so that X=a1/a2, that is: $a_1 - xa_2 = 0$. After the 2×2 adjustable beamsplitter 13 performs beam combination processing, the following electric vector of the first output and electric vector of the second output are obtained:

$$\begin{pmatrix} E_{21} \\ E_{22} \end{pmatrix} = e^{j\varphi_1} \begin{pmatrix} 0 \\ j\sqrt{a_1^2 + a_2^2} \end{pmatrix}.$$

In other words, optical power of the second output is $\sqrt{a_1^2 + a_2^2}$. In other words, theoretically, an introduced extra loss is 0. The optical power of the first output is 0, and the first output is to the photoelectric detector 14. The photoelectric detector 14 may detect this output and perform feedback control. If the optical power of the first output is 0, the working current of the first output is 0, which is a theoretical value. A current threshold may be preset. Therefore, when a working current that is fed back by the photoelectric detector 14 to the microprocessor 15 is greater than the preset threshold, the microprocessor 15 continues to adjust the working voltage of the phase shifter 12 and the working voltage of the 2×2 adjustable beamsplitter 13 to change the working current of the first output. If a working current that is fed back by the photoelectric detector 14 to the microprocessor 15 is less than or equal to the preset threshold, the microprocessor 15 stops adjusting the working voltage of the phase shifter and the working voltage of the 2×2 adjustable beamsplitter.

In the optical coupling apparatus provided in this embodiment, the coupling and polarization beamsplitter, the phase shifter, the 2×2 adjustable beamsplitter, the photoelectric detector, and the microprocessor are disposed. The coupling and polarization beamsplitter couples the light from the optical fiber into the waveguide, and performs polarization beam splitting to obtain the first TE polarized beam and the second TE polarized beam, the first TE polarized beam and the second TE polarized beam having the phase difference. The phase shifter adjusts the phase difference between the two polarized beams and the 2×2 adjustable beamsplitter performs beam combination processing to obtain the two outputs. The photoelectric detector detects the working current of the first output thereof, and feeds back the detected working current to the microprocessor. The microprocessor controls the voltage of the phase shifter 12 and adjusts the working voltage of the 2×2 adjustable beamsplitter 13 based on the received working current, to enable the working current of the first output to be close to a theoretical value of 0. In this way, light in any polarization direction can be coupled from an optical fiber into a waveguide, an extra insertion loss is small, a structure is simple, and miniaturization is easy to be implemented.

Figure 3:
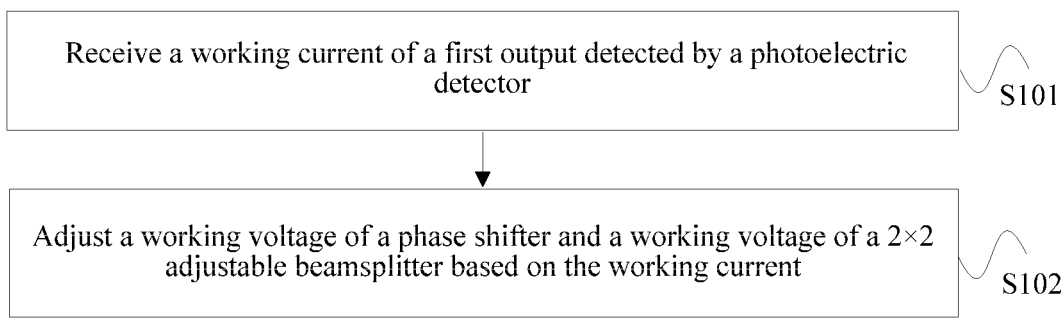
FIG. 3 is a flowchart of a control method for an optical coupling apparatus according to an embodiment of the present application.

FIG. 3 is a flowchart of a control method for an optical coupling apparatus according to an embodiment of the present application. As shown in FIG. 3, this embodiment is used for an optical coupling apparatus that includes a coupling and polarization beamsplitter, a phase shifter, a 2×2 adjustable beamsplitter, and a photoelectric detector. The method in this embodiment includes the following operations.

Operation S101: Receive a working current of a first output detected by the photoelectric detector.

The first output is one of two outputs obtained when the phase shifter performs phase difference adjustment and the 2×2 adjustable beamsplitter performs beam combination processing on a first TE polarized beam and a second TE polarized beam, wherein the first TE polarized beam and the second TE polarized beam, having a phase difference, are obtained after the coupling and polarization beamsplitter couples light from an optical fiber into a waveguide and performs polarization beam splitting and rotation, and a ratio of intensity of the first TE polarized beam to intensity of the second TE polarized beam is a1:a2.

Operation S102: Adjust, based on the working current, a working voltage of the phase shifter and a working voltage of the 2×2 adjustable beamsplitter.

In one embodiment, the coupling and polarization beamsplitter is a two-dimensional grating coupler. The two-dimensional grating coupler may couple light from an optical fiber into a waveguide, and performs polarization beam splitting to obtain a first TE polarized beam and a second TE polarized beam, the first TE polarized beam and the second TE polarized beam having a phase difference. However, when grating coupling is used, optical bandwidth is reduced. Therefore, in this embodiment of the present application, the coupling and polarization beamsplitter may comprise a spotsize converter and a polarization beamsplitter-rotator. The spotsize converter is configured to couple the light from the optical fiber into the waveguide; and the polarization beamsplitter-rotator is configured to perform polarization beam splitting and rotation, to obtain a first TE polarized beam and a second TE polarized beam, the first TE polarized beam and the second TE polarized beam having a phase difference. Compared with the two-dimensional grating coupler, when the spotsize converter and the polarization beamsplitter-rotator are used, a very wide band can be covered, and optical bandwidth is relatively wide.

In one embodiment, operation S102 is: adjusting the working voltage of the phase shifter and the working voltage of the 2×2 adjustable beamsplitter, until the working current is less than or equal to a preset threshold. For example, after a working current of a first output is received, whether the working current is less than or equal to a preset threshold is determined. If the working current is less than or equal to the preset threshold, a current working voltage of the phase shifter and a current working voltage of the 2×2 adjustable beamsplitter are respectively used as target working voltages of the phase shifter and the 2×2 adjustable beamsplitter; or if not, the working voltage of the phase shifter and the working voltage of the 2×2 adjustable beamsplitter continue to be adjusted. The preset threshold is experimental data, and a theoretical value is 0.

In one embodiment, operation S102 is: adjusting the working voltage of the phase shifter and the working voltage of the 2×2 adjustable beamsplitter based on a target working voltage of the phase shifter and a target working voltage of the 2×2 adjustable beamsplitter. The target working voltage of the phase shifter and the target working voltage of the 2×2 adjustable beamsplitter are a corresponding working voltage of the phase shifter and a corresponding working voltage of the 2×2 adjustable beamsplitter when the working current is the minimum. For example, a working current, which is the minimum, is determined as follows: determining a corresponding minimum value of the working current of the first output when the phase shifter is working at N different working voltages in a first preset range and the 2×2 adjustable beamsplitter is working at N different working voltages in a second preset range. A working voltage of the phase shifter corresponding to the minimum value of the working current of the first output is used as the target working voltage of the phase shifter, and a working voltage of the 2×2 adjustable beamsplitter corresponding to the minimum value of the working current of the first output is used as the target working voltage of the 2×2 adjustable beamsplitter. The first preset range and the second preset range may be close to a theoretical value 0, which is the working current of the first output.

For a technical principle for adjusting the working voltage of the phase shifter and the working voltage of the 2×2 adjustable beamsplitter to enable optical power of the first output to be 0, refer to the foregoing apparatus embodiment part. Details are not described herein again.

According to the control method for the optical coupling apparatus provided in this embodiment, based on the received working current, the microprocessor controls the voltage of the phase shifter and adjusts the working voltage of the 2×2 adjustable beamsplitter, to enable optical power of the first output to be close to a theoretical value of 0. In this way, light in any polarization direction can be coupled from an optical fiber into a waveguide, and an extra insertion loss is small.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

A person of ordinary skill in the art may understand that, each aspect of this application or a possible implementation of each aspect may be implemented as a system, a method, or a computer program product. Therefore, aspects of this application or possible implementations of the aspects may use forms of hardware only embodiments, software only embodiments (including firmware, resident software, and the like), or embodiments with a combination of software and hardware, which are uniformly referred to as "circuit", "module", or "system" herein. In addition, the aspects of this application or the possible implementations of the aspects may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each operation or a combination of operations in a flowchart; an apparatus is generated to implement a function and an action specified in each block or a combination of blocks in a block diagram.

All computer-readable program code may be locally executed on a user computer, or some may be locally executed on a user computer as a standalone software package, or some may be executed on a local computer of a user while some is executed on a remote computer, or all the code may be executed on a remote computer or a server. It should also be noted that, in some alternative implementation solutions, each operation in the flowcharts or functions specified in each block in the block diagrams may not occur in the illustrated order. For example, two consecutive operations or two blocks in the illustration, which are dependent on an involved function, may in fact be executed substantially at the same time, or these blocks may sometimes be executed in reverse order.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An optical coupling apparatus, comprising:
a coupling and polarization beamsplitter, a phase shifter, a 2×2 adjustable beamsplitter, a photoelectric detector, and a microprocessor, wherein
the coupling and polarization beamsplitter is configured to: couple light from an optical fiber into a waveguide, and perform polarization beam splitting and rotation to obtain a first transverse electric (TE) polarized beam and a second TE polarized beam, the first TE polarized beam and the second TE polarized beam having a phase difference, wherein a ratio of intensity of the first TE polarized beam to intensity of the second TE polarized beam is $a_1:a_2$;
the phase shifter is coupled between the coupling and polarization beamsplitter and the 2×2 adjustable beamsplitter, and the phase shifter is configured to adjust the phase difference between the first TE polarized beam and the second TE polarized beam based on a working voltage of the phase shifter;
the 2×2 adjustable beamsplitter is configured to: adjust a split ratio based on a working voltage of the 2×2 adjustable beamsplitter, and perform beam combination processing on the first TE polarized beam and the second TE polarized beam based on the split ratio to obtain a first output and a second output;

the photoelectric detector is coupled between the 2×2 adjustable beamsplitter and the microprocessor, and the photoelectric detector is configured to: detect a working current of the first output, and send the working current to the microprocessor; and the microprocessor is configured to adjust the working voltage of the phase shifter and the working voltage of the 2×2 adjustable beamsplitter based on the received working current.

2. The optical coupling apparatus according to claim 1, wherein the coupling and polarization beamsplitter comprises a spotsize converter and a polarization beamsplitter-rotator;

the spotsize converter is configured to couple the light from the optical fiber into the waveguide; and the polarization beamsplitter-rotator is configured to perform polarization beam splitting and rotation, to obtain the first TE polarized beam and the second TE polarized beam, the first TE polarized beam and the second TE polarized beam having the phase difference.

3. The optical coupling apparatus according to claim 1, wherein the coupling and polarization beamsplitter is a two-dimensional grating coupler.

4. The optical coupling apparatus according to claim 1, wherein the microprocessor is configured to:

adjust the working voltage of the phase shifter and the working voltage of the 2×2 adjustable beamsplitter, until the working current is less than or equal to a preset threshold.

5. The optical coupling apparatus according to claim 1, wherein the microprocessor is configured to:

adjust the working voltage of the phase shifter based on a target working voltage of the phase shifter, wherein the target working voltage of the phase shifter is a corresponding working voltage of the phase shifter when the working current is the minimum; and adjust the working voltage of the 2×2 adjustable beamsplitter based on a target working voltage of the 2×2 adjustable beamsplitter, wherein the target working voltage of the 2×2 adjustable beamsplitter is a corresponding working voltage of the phase shifter and a corresponding working voltage of the 2×2 adjustable beamsplitter when the working current is the minimum.

6. A control method for an optical coupling apparatus, the method comprising:

coupling, by a coupling and polarization beamsplitter, light from an optical fiber into a waveguide, and performing polarization beam splitting and rotation to obtain a first TE polarized beam and a second TE polarized beam, the first TE polarized beam and the second TE polarized beam having a phase difference, wherein a ratio of intensity of the first TE polarized beam to intensity of the second TE polarized beam is $a_1:a_2$, and wherein the optical coupling apparatus comprises the coupling and polarization beamsplitter, a phase shifter, a 2×2 adjustable beamsplitter, a photoelectric detector, and a microprocessor;

adjusting, by the phase shifter, the phase difference between the first TE polarized beam and the second TE polarized beam based on a working voltage of the phase shifter;

adjusting, by the 2×2 adjustable beamsplitter, a split ratio based on a working voltage of the 2×2 adjustable beamsplitter, and performing beam combination processing on the first TE polarized beam and the second TE polarized beam based on the split ratio, to obtain a first output and a second output;

detecting, by the photoelectric detector, a working current of the first output, and sending the working current to the microprocessor;

adjusting, by the microprocessor, the working voltage of the phase shifter and the working voltage of the 2×2 adjustable beamsplitter based on the received working current.

7. The method according to claim 6, wherein the coupling and polarization beamsplitter comprises a spotsize converter and a polarization beamsplitter-rotator;

coupling, by the spotsize converter, the light from the optical fiber into the waveguide; and performing, by the polarization beamsplitter-rotator, polarization beam splitting and rotation, to obtain the first TE polarized beam and the second TE polarized beam, the first TE polarized beam and the second TE polarized beam having the phase difference.

8. The method according to claim 6, wherein the adjusting, by the microprocessor, the working voltage of the phase shifter and the working voltage of the 2×2 adjustable beamsplitter based on the received working current comprises:

adjusting, by the microprocessor, the working voltage of the phase shifter and the working voltage of the 2×2 adjustable beamsplitter, until the working current is less than or equal to a preset threshold.

9. The method according to claim 6, wherein the adjusting, by the microprocessor, the working voltage of the phase shifter and the working voltage of the 2×2 adjustable beamsplitter based on the received working current comprises:

adjusting, by the microprocessor, the working voltage of the phase shifter based on a target working voltage of the phase shifter, wherein the target working voltage of the phase shifter is a corresponding working voltage of the phase shifter when the working current is the minimum; and adjusting, by the microprocessor, the working voltage of the 2×2 adjustable beamsplitter based on a target working voltage of the 2×2 adjustable beamsplitter, wherein the target working voltage of the 2×2 adjustable beamsplitter is a corresponding working voltage of the 2×2 adjustable beamsplitter when the working current is the minimum.

10. A control method, and the method comprising:

receiving, by a microprocessor, a working current of a first output detected by the photoelectric detector, wherein the first output is one of two outputs obtained from a 2×2 adjustable beamsplitter; and adjusting, by the microprocessor, a working voltage of the phase shifter and a working voltage of the 2×2 adjustable beamsplitter based on the working current.

11. The method according to claim 10, wherein the phase shifter is configured to perform phase difference adjustment and the 2×2 adjustable beamsplitter is configured to perform beam combination processing on a first TE polarized beam and a second TE polarized beam, the first TE polarized beam and the second TE polarized beam having a phase difference.

12. The method according to claim 10, wherein the adjusting, by the microprocessor, a working voltage of the phase shifter and a working voltage of the 2×2 adjustable beamsplitter based on the working current comprises:

adjusting, by the microprocessor, the working voltage of the phase shifter and the working voltage of the 2×2 adjustable beamsplitter, until the working current is less than or equal to a preset threshold.

13. The method according to claim 10, wherein the adjusting, by the microprocessor, a working voltage of the phase shifter and a working voltage of the 2×2 adjustable beamsplitter based on the working current comprises:
adjusting, by the microprocessor, the working voltage of the phase shifter based on a target working voltage of the phase shifter, wherein the target working voltage of the phase shifter is a corresponding working voltage of the phase shifter when the working current is the minimum; and
adjusting, by the microprocessor, the working voltage of the 2×2 adjustable beamsplitter based on a target working voltage of the 2×2 adjustable beamsplitter, wherein the target working voltage of the 2×2 adjustable beamsplitter is a corresponding working voltage of the 2×2 adjustable beamsplitter when the working current is the minimum.

* * * * *